F. R. STEARNS.
BEET TOPPING MACHINE.
APPLICATION FILED JUNE 13, 1912.

1,069,351.

Patented Aug. 5, 1913.

Witnesses:

Inventor.
Frank R. Stearns
by
Hazard & Hause
Attys.

UNITED STATES PATENT OFFICE.

FRANK R. STEARNS, OF LOS ANGELES, CALIFORNIA.

BEET-TOPPING MACHINE.

1,069,351. Specification of Letters Patent. Patented Aug. 5, 1913.

Application filed June 13, 1912. Serial No. 703,423.

*To all whom it may concern:*

Be it known that I, FRANK R. STEARNS, a citizen of the United States, residing at Los Angeles, in the county of Los Angeles and State of California, have invented a new and useful Beet-Topping Machine, of which the following is a specification.

My improvement relates more specifically to an improvement in beet topping machines, and an object thereof is to provide a simple mechanism which may be drawn or propelled through a field of beets to quickly and expeditiously remove the foliage or leaves from the growing beets preparatory to removing the same from the ground by means of plows.

A further and important object is to provide an apparatus having a plurality of cutting mechanisms, whereby beets that do not project the usual distance above the surface of the ground may be topped with equal facility.

Figure 1:
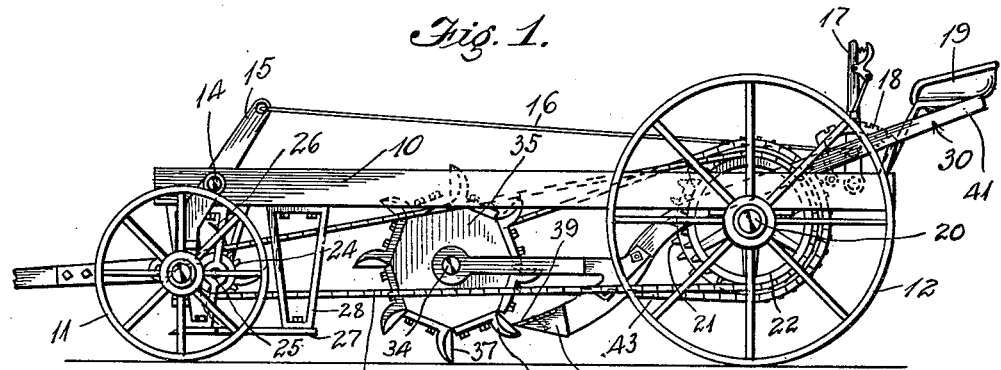
Figure 2:
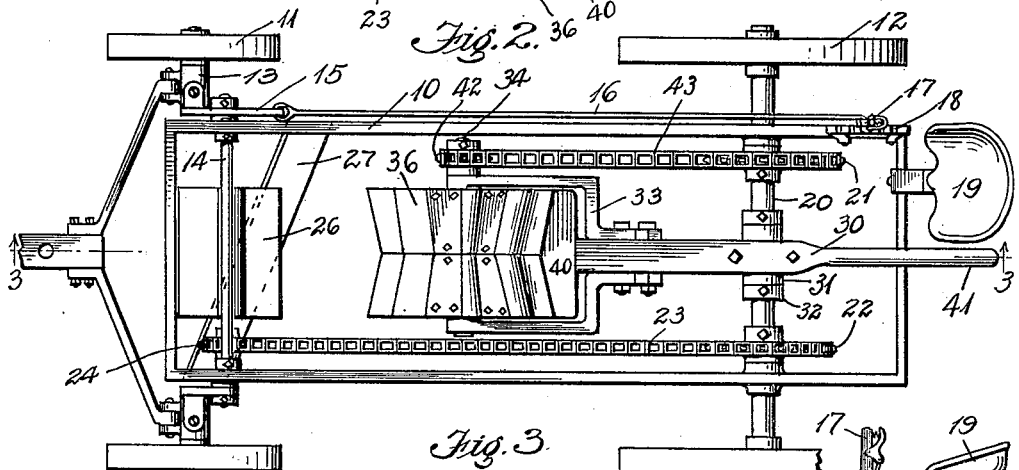
Figure 3:
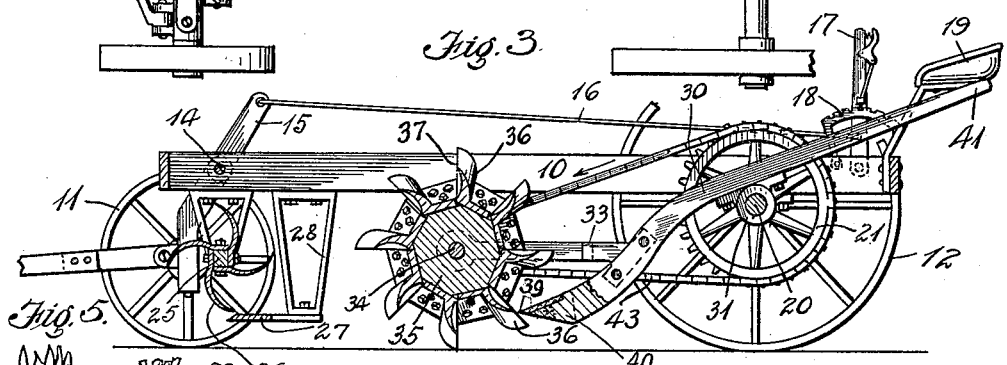
Figure 5:
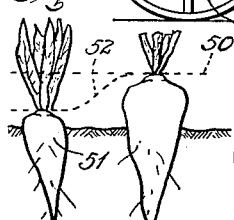
Figure 4:
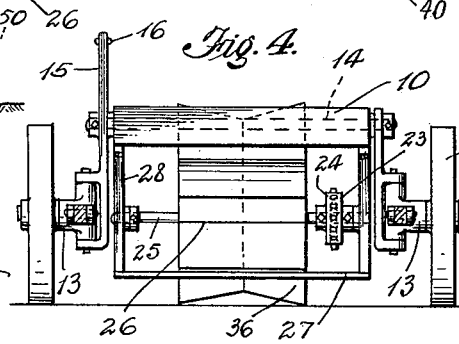

In the drawings accompanying this specification, Figure 1 is a side elevation of my machine. Fig. 2 is a plan view of the machine. Fig. 3 is a longitudinal section on line 3—3 of Fig. 2. Fig. 4 is a front elevation of the machine. Fig. 5 is a diagrammatic view of a portion of a row of beets projecting an unusual height above ground and illustrating by dotted lines the path of travel of the two cutters.

Heretofore in the beet industry, difficulty has been experienced when topping the beets in reaching those which do not attain the usual or normal height in the row and in cleanly removing from the root member the stem and leaves at the proper location. My invention overcomes the difficulties mentioned, and, as shown more specifically in the drawing, I provide a frame 10 with suitable supporting wheels 11, 12, the forward wheels 11 being pivotally journaled at 13. The journals are supported on arms rigidly secured to a rock shaft 14 in any approved manner, the rock shaft being pivotally mounted in the frame, one arm being preferably extended to a point above the frame to form a controlling lever 15.

Movably secured in the end of the lever 15 is a connecting rod 16 its rear end secured to the operating lever 17 pivoted near the rear of the frame, and secured to a rack 18 with a locking latch with hand release, all being placed in convenient proximity to the seat 19, provided for the operator of the machine. The rear wheels 12 are rigidly secured to axle 20 journaled in any suitable manner in the frame and are preferably larger in diameter than the front wheels and carry on their revolving axle 20, sprocket wheels 21, 22. Traveling on the sprocket wheel 22 is the sprocket chain 23 which engages the sprocket wheel 24 on shaft 25 mounted at the forward end of the frame, carrying the cutting knives 26, these cutting knives being adapted to coöperate with the cutting knife 27, rigidly secured to the frame by the brackets 28, being shown preferably in a diagonal position on the frame. As will be seen, the adjustment of the forward wheels by means of its connections under the control of the operator will permit the knife blade 27 to be raised or lowered to accommodate the knife 27 to a plane or level on which it is desired to remove the tops.

Pivoted on the rear axle I provide a lever 30 with bearings 31 held in proper position on the axle by adjustable sleeves 32. On the forward end of the lever are placed yoke arms 33 secured in any suitable manner which embrace and form bearings for the shaft 34 on which is rigidly secured the cutter head 35. Mounted on the head are the knife blades 36 formed with inwardly curved faces terminating in cutting edges 37 which engage cutting edge 39 of the fixed knife 40 secured to the lever between the yokes 33. The knives 36 are preferably formed so that their cutting edges unite in the center to form an angular shaped cutting edge which allows the knives to reach the tops of beets lower than would be the case with a flat blade. Extending to the rear beyond its bearings a sufficient distance to balance, the lever 30 is provided with hand hold 41 placed in a convenient position to be grasped by the operator, preferably located on the opposite side of the operator's seat, from the lever 17. Rigidly secured to the shaft 34 and the cutter head thereon is a sprocket wheel 42 adapted to carry the sprocket chain 43 which engages sprocket wheel 21 on the drive shaft of the machine.

The operation of my machine will be readily understood from the following: When the machine is drawn by any suitable means with the wheels traveling on each side of a row of beets, the height of the cutter blade 27 is adjusted to travel along a normal plane indicated by the dotted line 50 in Fig. 5. The auxiliary cutting member is normally held out of position preferably geared as shown to revolve at a higher speed than the forward cutting head so that when a beet as at 51 is met in the row which has not attained such a growth as its neighbor or does not project as far from the ground, the forward knife would sever the top too high. Here the operator depresses the auxiliary cutting member and causes the same to travel a path as 52 shown in dotted lines and remove the top of beet 51 at the desired location.

What I claim is:

1. A beet topper, comprising an adjustable frame, journals on said frame, a wheel shaft carried through said journals, wheels rigidly secured to the ends of said shaft to support said frame, a lever pivotally mounted on said shaft provided with a cutting edge on its dependent end, and an operating handle at its oppositely disposed end, a yoke mounted on said lever adjacent said cutting edge, journals on the terminal end of said yoke, a shaft revolubly supported in said journals, a drum secured to said shaft, a plurality of knife blades mounted on said drum, the cutting edges inclined from their central point outwardly, said angle conforming with the cutting edge on said lever and coacting therewith, and means to drive said drum from said wheel shaft.

2. A beet topper comprising an adjustable frame, a driving shaft, a lever pivoted to said drive shaft, a knife provided with a cutting edge rigidly secured to said lever, a plurality of knives having peripheral cutting edges revolubly mounted on said lever adjacent to said knife and coacting therewith, said coacting edges of said knives being formed with angularly disposed cutting edges, and means to rotate said revolving knives.

In witness that I claim the foregoing I have hereunto subscribed my name this 5th day of June, 1912.

F. R. STEARNS.

Witnesses:
M. J. WEBB,
EARLE R. POLLARD.

---

Copies of this patent may be obtained for five cents each, by addressing the "Commissioner of Patents, Washington, D. C."